(12) United States Patent
Heater et al.

(10) Patent No.: US 7,957,748 B2
(45) Date of Patent: Jun. 7, 2011

(54) SYSTEM AND METHODS FOR ESTABLISHING A REAL-TIME LOCATION-BASED SERVICE NETWORK

(75) Inventors: Kevin Abram Heater, Fort Collins, CO (US); Scott Paul Simmons, Fort Collins, CO (US)

(73) Assignee: TechniGraphics, Inc., Wooster, OH (US)

( * ) Notice: Subject to any disclaimer, the term of this patent is extended or adjusted under 35 U.S.C. 154(b) by 858 days.

(21) Appl. No.: 11/875,045

(22) Filed: Oct. 19, 2007

(65) Prior Publication Data
US 2009/0104919 A1    Apr. 23, 2009

(51) Int. Cl.
*H04W 88/02* (2009.01)
(52) U.S. Cl. .................. 455/456.1; 455/412.1
(58) Field of Classification Search .......... 455/456.1, 455/412.1; 370/310; 701/209; 702/150; 342/357.6
See application file for complete search history.

(56) References Cited

U.S. PATENT DOCUMENTS

| | | | |
|---|---|---|---|
| 6,327,533 B1 | 12/2001 | Chou | |
| 6,452,544 B1 | 9/2002 | Hakala et al. | |
| 6,456,854 B1 | 9/2002 | Chern et al. | |
| 6,609,005 B1 | 8/2003 | Chern | |
| 6,680,919 B1 | 1/2004 | Rauhala | |
| 6,845,324 B2 | 1/2005 | Smith | |
| 6,862,500 B2 * | 3/2005 | Tzamaloukas | 701/1 |
| 6,879,838 B2 | 4/2005 | Rankin et al. | |
| 6,898,516 B2 * | 5/2005 | Pechatnikov et al. | 701/202 |
| 6,917,878 B2 | 7/2005 | Pechatnikov et al. | |
| 7,035,618 B2 | 4/2006 | Schnurr | |
| 7,076,365 B2 * | 7/2006 | Tzamaloukas | 701/217 |
| 7,089,020 B2 | 8/2006 | Asthana et al. | |
| 7,236,882 B2 | 6/2007 | Karaoguz et al. | |
| 7,266,395 B2 | 9/2007 | Schnurr | |
| 7,343,564 B2 * | 3/2008 | Othmer | 715/774 |
| 7,672,483 B2 * | 3/2010 | McGrath et al. | 382/103 |
| 2002/0000930 A1 | 1/2002 | Crowson et al. | |
| 2004/0230345 A1 * | 11/2004 | Tzamaloukas | 701/1 |
| 2005/0288036 A1 | 12/2005 | Brewer et al. | |

(Continued)

FOREIGN PATENT DOCUMENTS

CN        1905697        1/2007

(Continued)

OTHER PUBLICATIONS

PCT/US2008/074382 International Search Report.

(Continued)

*Primary Examiner* — Diane Mizrahi
(74) *Attorney, Agent, or Firm* — Hahn Loeser & Parks LLP

(57) ABSTRACT

A network and method to establish a real-time location based service for client mobile device users. Asynchronous data connections are established between client mobile devices and a data server over wireless networks. Synchronous data connections are established between the client devices and a map server over wireless networks. The data server receives geographic location information from the client devices, indicating a geographic location of each client device, and relays the geographic location information to the client devices in real time via the asynchronous data connections. The map server provides map data to the client devices as requested from the client devices via the synchronous data connections. The geographic location information may be overlaid onto the map data and displayed on any of the client mobile devices to indicate the various locations of the various client devices in real time.

6 Claims, 7 Drawing Sheets

U.S. PATENT DOCUMENTS

| | | |
|---|---|---|
| 2006/0161628 A1 | 7/2006 | Nagy et al. |
| 2007/0004404 A1 | 1/2007 | Buckley et al. |
| 2007/0005795 A1* | 1/2007 | Gonzalez ............... 709/232 |
| 2007/0040895 A1 | 2/2007 | Barbeau |
| 2007/0088790 A1 | 4/2007 | Shenfield et al. |
| 2007/0093237 A1 | 4/2007 | Bayne |
| 2007/0168123 A1 | 7/2007 | Eros et al. |
| 2007/0184855 A1 | 8/2007 | Klassen et al. |

FOREIGN PATENT DOCUMENTS

| | | |
|---|---|---|
| DE | 10110866 A1 | 10/2001 |
| GB | 2424149 A | 9/2006 |
| JP | 2002209271 A | 7/2002 |
| JP | 2003139842 A | 5/2003 |
| JP | 2003264859 | 9/2003 |
| JP | 2003319438 A | 11/2003 |
| JP | 2005018637 A | 1/2005 |
| JP | 2005134519 A | 5/2005 |
| JP | 2005295030 A | 10/2005 |
| JP | 2006275922 A | 10/2006 |
| KR | 20010003929 | 1/2001 |
| KR | 20010061325 A | 7/2001 |
| KR | 20030000530 A | 1/2003 |
| KR | 20030041502 A | 5/2003 |

OTHER PUBLICATIONS

PCT/US2008/074382 Written Opinion.

* cited by examiner

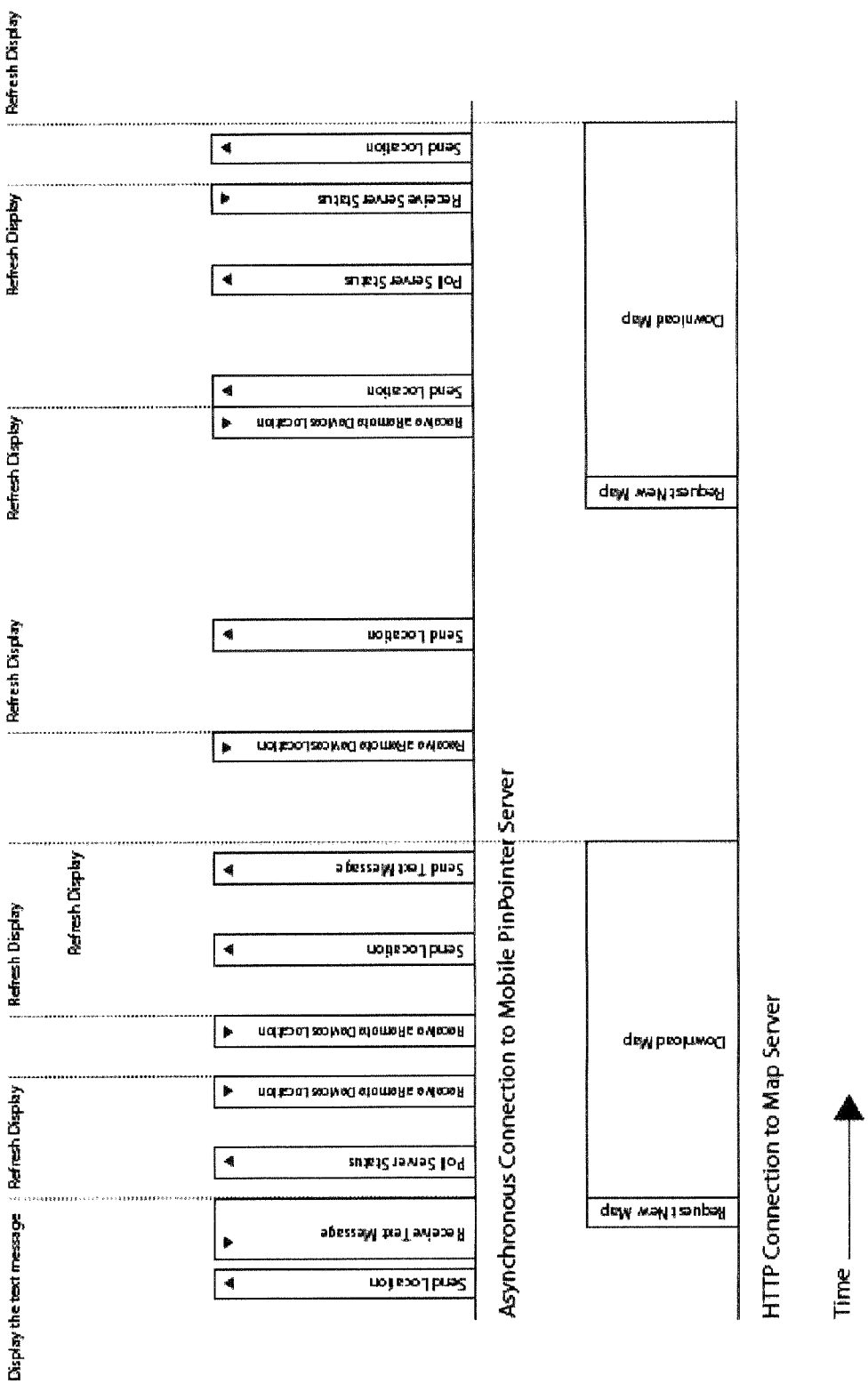

SYSTEM AND METHODS FOR ESTABLISHING A REAL-TIME LOCATION-BASED SERVICE NETWORK

TECHNICAL FIELD

Certain embodiments of the present invention relate to network services. More particularly, certain embodiments of the present invention relate to a system and methods to establish a real-time location based service network for mobile device users.

BACKGROUND

Providing situational awareness to mobile device clients (users) in the field has been a challenge. For example, the accuracy and reliability of location-based services provided by cellular providers is often inadequate for many field applications. Similarly, the delays and fees associated with messaging and location-based services from cellular providers can be burdensome to the client user. Many location-based services have a high latency between the time a sample is recorded and the display of that location information on another device, as there is a requirement to write location specific data to a permanent storage device before being disseminated to other mobile devices. Other factors contributing to the high latency and poor refresh rate of the location information may include inefficient use of available network bandwidth, and "dead air" periods which may be associated with a rigid synchronous request/response cycle. Such overhead can make a system undesirably costly and, furthermore, unnecessarily limit the number of field units available to a particular situational awareness scenario.

Therefore there remains a need in the art for a location-based service network providing accurate and reliable location information to a multitude of mobile clients (and non-mobile clients) in real time, thus providing a higher level of situational awareness to those clients.

Further limitations and disadvantages of conventional, traditional, and proposed approaches will become apparent to one of skill in the art, through comparison of such systems and methods with the present invention as set forth in the remainder of the present application with reference to the drawings.

SUMMARY

A real-time location based service for mobile assets is described herein. The system may use, for example, commercially available Blackberry® devices and wireless services anywhere in the world supporting the Blackberry® data networks. The system may rely on an internal or external GPS unit to provide superior accuracy and reliability as compared to location-based services from current cellular providers. The GPS device may be either integrated into the Blackberry® device (as included in more recent models) or carried separately and wirelessly connected to the Blackberry® via Bluetooth®. Such a design allows real-time updates of positions, visible to all users logged into the associated network as including a map display on the Blackberry® devices themselves. Secure two-way and broadcast text messaging between mobile devices and non-mobile clients is possible at any time. In addition, the mobile user can make or receive phone calls while the system is in operation. The GPS units employed have positional accuracies typically superior to ten meters, and often in the range of two to four meters. Positions can be broadcast at any frequency equal to or greater than the refresh rate of the GPS unit, and can be dynamically updated based on the devices power profile e.g. the device may send updates more frequently while attached to a power supply.

A unique data transmission protocol is used to circumvent the typical delays and fees associated with messaging and location-based services from current cellular providers. Since it is relatively easy to intercept SMS (short message service) and regular internet traffic, the network connections use encryption techniques to provide a secure means of delivering location specific information to the associated network. Due to the constraints of operating over thin wireless pipes, network traffic volume is significantly reduced, and the server software has quite light hardware requirements.

The system is ideal for deployment in intelligence gathering as well as operational scenarios. Observations can be delivered to clients in real-time. Likewise, commands from the stationary thin clients are available to field units instantly and can be broadcast to single or groups of users. Uptime of the field units is limited by the battery life of the devices, and for most units can exceed 8 hours without a recharge.

A field unit may comprise a Blackberry® device (e.g., having software version 4.1 or later) and means to receive the location of the device from an internal or an external GPS unit, or the devices internal location capabilities which may include cell tower triangulation. To maximize reliability, and facilitate best of breed design all components may be Commercial Off-the-Shelf (COTS) and may be interchangeable. Should a handheld or GPS device fail, either can be replaced by a similar model and the device software can quickly be reconfigured or reloaded. Furthermore, improvements in technology for either component may be readily integrated (e.g. more precise GPS units, better handhelds, etc.).

The field unit software may be very compact and may be quickly loaded into the handheld via an OTA (over the air) software install. The software reads the data stream from the GPS and instantly broadcasts GPS location to the server. The interval of position broadcast may be controlled by the handheld user. Available external GPS units include WAAS and EGNOS correction and vary in precision from standard, consumer-level to sub-meter field mapping accuracy. Any NMEA-compatible GPS unit may be used, although, it may be desirable to use Bluetooth serial communication which can be located in a position with a better view of the sky. Any device may be used, however, that provides a geographic coordinate that is accessible to the field unit and the software on the field unit. Internal GPS receivers tend to have less positional accuracy. The geographic data should be accurate enough to physically locate a user without any significant trouble under reasonable circumstances and a strong GPS signal should be available.

The client software is aware of the location and status of other mobile devices and is also aware of the status of the server itself. In addition to text message communications, mobile devices can send and receive special prioritized status information including a help message which will immediately signal all devices that a user is in distress, and a kill switch which will disable all incoming data from the rest of the network.

The server software includes two components: (1) a network service for receipt and delivery of positional information, text messages, and status notifications, and (2) a web mapping service that provides pre-rendered map graphics to the clients. The first component monitors the status of field units, and relays geographic information and text messages between all field units and stationary clients in real-time without the need for permanent storage. The server will also prioritize outgoing network data to provide quick dissemination of high priority messages. Due to the nature of currently available cellular technology, communication from the clients is very compact in size, allowing several hundred field units to connect with one server concurrently.

Client applications of the system may be designed to work with many industry standard map server software packages including ESRI's ArcGIS Server, Google Maps, and any OGC compliant WMS suites.

A stationary thin client application may be provided for users to participate in the network from desktop computers. The stationary thin client operates in a web browser, and includes map display and query functions, as well as an interface that allows two-way text, status communication with the field units and remote configuration. The thin client may be highly standards compliant, and designed to run in most modern web browsers. The stationary thin client may also be used to configure authentication and authorization services.

An embodiment of the present invention comprises a method to establish a real-time location based service network for mobile device users. The method includes establishing a first asynchronous data connection between a first mobile device and a data server using a proprietary TCP/IP based protocol over a wireless network. As used herein, the term 'asynchronous data connection' refers to communications that may occur using an asynchronous network protocol (i.e., a protocol that does not follow a request/response cycle). TCP/IP stands for Transmission Control Protocol/Internet Protocol which is a well-known suite of Internet protocols used for connecting hosts on the Internet. The method further includes establishing at least a second asynchronous data connection between at least a second mobile device and the data server using the proprietary TCP/IP based protocol over a wireless network.

The method also includes establishing a first synchronous data connection between the first mobile device and a map server using HTTP (HyperText Transfer Protocol) or HTTPS (secure HTTP) over a wireless network. As used herein, the term 'synchronous data connection' refers to communications that may occur using a synchronous network protocol (i.e., a protocol that follows a request/response cycle such as HTTP). HTTPS provides secure communications by encrypting the data (e.g., encryption using transport layer security (TLS) or secure socket layer (SSL)). The method further includes establishing at least a second synchronous data connection between at least the second mobile device and the map server using the HTTP or the HTTPS protocol over a wireless network.

In accordance with an alternative embodiment, the data server and the map server may be one in the same server. The proprietary TCP/IP based protocol may use encryption techniques (e.g., TLS encryption) to provide secure communications.

The method may further include establishing a cell phone voice connection between the first mobile device and the second mobile device over a wireless network without disrupting the first asynchronous data connection or the second asynchronous data connection.

The method may further include establishing a first wireless data connection between a first global positioning system (GPS) receiver and the first mobile device, wherein the first mobile device is in operational proximity to the first GPS receiver. The method may further include establishing a second wireless data connection between a second GPS receiver and the second mobile device, wherein the second mobile device is in operational proximity to the second GPS receiver.

Another embodiment of the present invention comprises a method to communicate location information of mobile device users over a wireless network in real time. The method includes asynchronously transmitting first position data corresponding to a current geographic location of a first mobile device to a data server via a first asynchronous data connection between the first mobile device and the data server over a wireless network. The method further includes asynchronously transmitting at least second position data corresponding to a current geographic location of at least a second mobile device to the data server via at least a second asynchronous data connection between at least the second mobile device and the data server over a wireless network. The method also includes synchronously transmitting a first map to the first mobile device via a first synchronous data connection between a map server and the first mobile device in response to a map request from the first mobile device to the map server over a wireless network. The method further includes synchronously transmitting at least a second map to at least the second mobile device via at least a second synchronous data connection between the map server and at least the second mobile device in response to a map request from at least the second mobile device to the map server over a wireless network. The method also includes asynchronously transmitting at least the second position data from the data server to the first mobile device via the first asynchronous data connection, and asynchronously transmitting at least the first position data from the data server to at least the second mobile device via at least the second asynchronous data connection.

The method may further include the first mobile device processing at least the second position data to accurately overlay indicia corresponding to at least the second position data on the first map, and to display the first map with the overlaid indicia on a display of the first mobile device. The method may also include the second mobile device processing at least the first position data to accurately overlay indicia corresponding to at least the first position data on the second map, and to display the second map with the overlaid indicia on a display of the second mobile device.

A further embodiment of the present invention comprises a real-time location based service network for mobile device users. The network includes a plurality of mobile devices, and a data server capable of asynchronously relaying at least geographic location information, status information, and text information between the plurality of mobile devices in real time. Each of the plurality of mobile devices is capable of being in asynchronous data communication with the data server over a wireless network to accomplish the relaying. The network also includes a map server capable of synchronously providing a map service to each of the plurality of mobile devices. Each of the plurality of mobile devices is capable of being in synchronous data communication with the map server over a wireless network to accomplish the providing of the map service.

The real-time location based service network may further include a plurality of GPS receivers, wherein any one of the GPS receivers corresponds to a single mobile device of the plurality of mobile devices. Each of the plurality of mobile devices includes a thin client software capable of reading a data stream including geographic location information from the corresponding GPS receiver and transmitting the geographic location information to the data server in real time via the asynchronous data communication path.

Each of the plurality of mobile devices includes a thick client software capable of generating a map request and transmitting the map request to the map server via the synchronous data communication path and receiving map data from the map server via the synchronous data communication path in response to the map request. The thick client software is further capable of rendering a map in response to receiving the map data and accurately overlaying indicia corresponding to the geographic location information onto the rendered map. The thick client software is also capable of displaying the rendered map with the overlaid indicia on a display of the mobile devices.

The plurality of mobile devices may include any of cell phone type devices, personal digital assistant (PDA) type devices, BlackBerry® type devices, portable media player type devices, laptop computer type devices, and wireless handheld type devices each supported by a corresponding wireless network. A wireless network in this context refers to a network of telecommunication devices that is capable of transmitting internet protocol data packets between two or more devices using at least one wireless connection. Examples of such technology may include, for example, Wi-Fi, WiMAX, UMTS, EV-DO, GPRS, EDGE, Packet Radio, and DVB networks. All wireless networks which are capable of transmitting internet protocol data packets are considered interchangeable in this context and a user of a mobile device may specify that the software use any available network or combination of available networks regardless of the state of the client software.

Another embodiment of the present invention comprises a method to communicate status information over a wireless network in real time. The method includes a data server asynchronously polling a first mobile device for a first status information, corresponding to a current status of the first mobile device, via a first asynchronous data connection between the data server and the first mobile device over a wireless network. The method further includes the data server asynchronously polling at least a second mobile device for at least a second status information, corresponding to a current status of at least the second mobile device, via at least a second asynchronous data connection between the data server and at least the second mobile device over a wireless network. The method also includes the first mobile device transmitting the first status information to the data server via the first asynchronous data connection, and at least the second mobile device transmitting at least the second status information to the data server via at least the second asynchronous data connection.

The method may further include the data server transmitting at least the first status information to at least the second mobile device via at least the second asynchronous data connection, and the data server transmitting at least the second status information to the first mobile device via the first asynchronous data connection.

The method may further include the first mobile device asynchronously polling the data server for a third status information, corresponding to a current status of the data server, via the first asynchronous data connection, and the data server transmitting the third status information to the first mobile device via the first asynchronous data connection.

The method may also include at least the second mobile device asynchronously polling the data server for the third status information via at least the second asynchronous data connection, and the data server transmitting the third status information to at least the second mobile device via at least the second asynchronous data connection.

A further embodiment of the present invention comprises a method to communicate help information over a wireless network in real time. The method includes a first mobile device asynchronously transmitting a first help message to a data server via a first asynchronous data connection between the first mobile device and the data server over a wireless network. The method also includes the data server receiving the first help message and immediately transmitting the first help message to at least a second mobile device via at least a second asynchronous data connection between the data server and at least the second mobile device in real time over a wireless network.

The method may further include at least the second mobile device displaying an indication of the help message on a display of at least the second mobile device such that the displayed indication is clearly associated with the first mobile device on the display. The method may also include at least the second mobile device sounding an audible alert in response to receiving the help message.

The method may further include at least the second mobile device transmitting a reply message to the data server in response to the help message via at least the second asynchronous data connection, and the data server relaying the reply message to the first mobile device via the first asynchronous data connection.

These and other advantages and novel features of the present invention, as well as details of illustrated embodiments thereof, will be more fully understood from the following description and drawings.

BRIEF DESCRIPTION OF THE DRAWINGS

FIG. 7 illustrates an exemplary embodiment of a communication timeline, in accordance with the real-time location based service network of FIG. 1.

DETAILED DESCRIPTION

Figure 1:
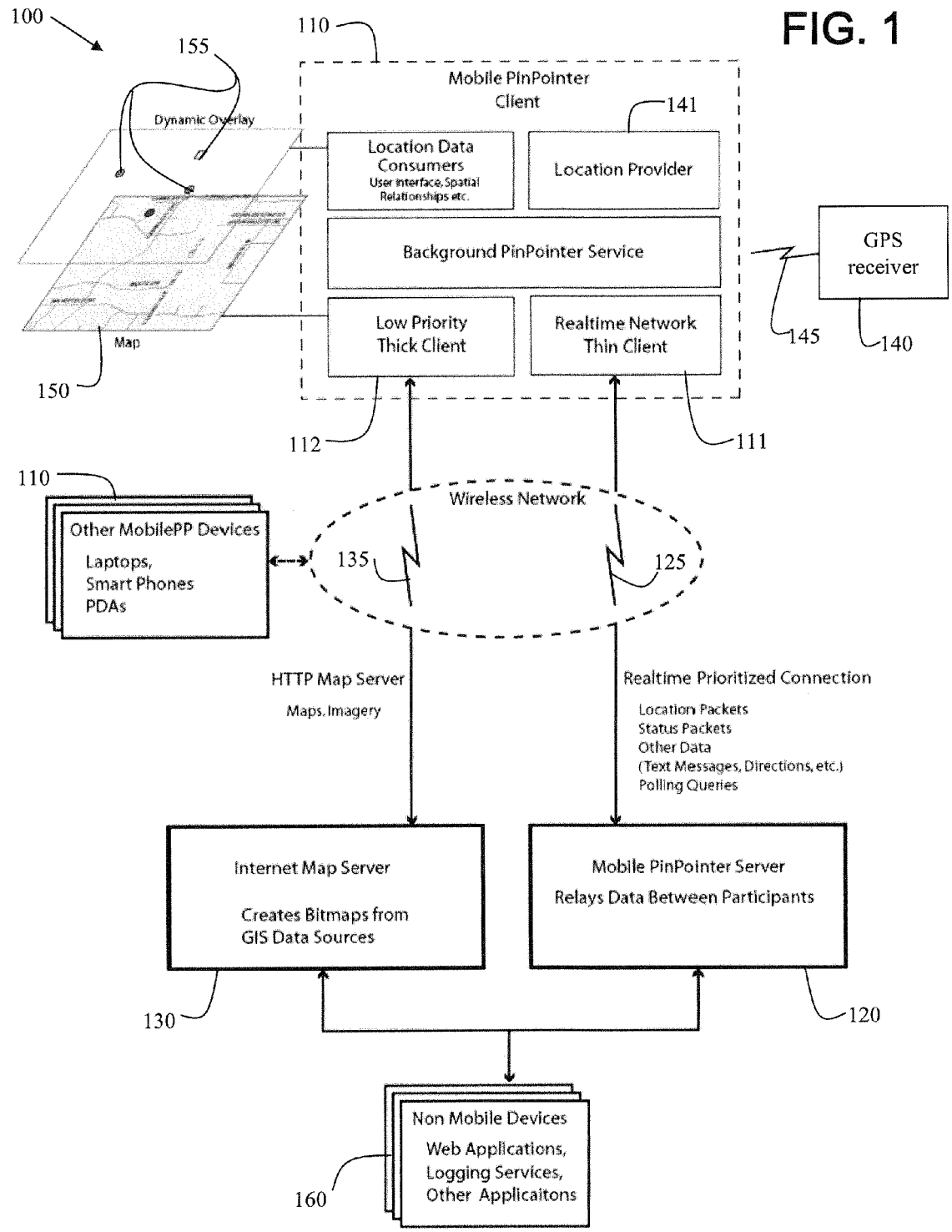
FIG. 1 illustrates a schematic block diagram of an exemplary embodiment of a real-time location based service network.

FIG. 1 illustrates a schematic block diagram of an exemplary embodiment of a real-time location based service network 100. The network 100 includes a plurality of mobile devices 110 such as, for example, smart phones, personal digital assistants (PDA's), BlackBerry® devices, portable media players, other types of wireless handheld devices, or laptop computers, all using their corresponding wireless networks.

The network 100 also includes a data server 120 capable of asynchronously relaying geographic location information, status information, and text message information between the plurality of mobile devices 110 in real time. The plurality of mobile devices 110 supported by the data server 120 defines a user group. Each of the plurality of mobile devices 110 is capable of being in asynchronous data communication with the data server 120 over a wireless network to accomplish the real time relaying function. As used herein, the term 'asynchronous data communication' refers to communications that may occur using an asynchronous network protocol (i.e., a protocol that does not follow a request/response cycle). In general, each mobile device 110 asynchronously provides its geographic location or position data to the data server 120 without a request from the server 120, and the data server 120 asynchronously relays or distributes all of the geographic location data received from each of the mobile devices 110 to each of the mobile devices 110 without a request from the mobile devices 110. As a result, each mobile device 110 is able to acquire the position data of all the other mobile devices in the group. This is all accomplished in a real time manner such that burdensome delays are not experienced by the users of the mobile devices 110 because the asynchronous communication allows more updates to occur in a given time interval.

The network 100 further includes a map server 130 capable of synchronously providing a map service to each of the plurality of mobile devices 110. Each of the plurality of mobile devices 110 is capable of being in synchronous data communication with the map server 130 over a wireless network to accomplish the providing of the map service. As used herein, the term 'synchronous data communication' refers to communications that may occur using a synchronous network protocol (i.e., a protocol that follows a request/response cycle such as HTTP). HTTP stands for HyperText Transfer Protocol and is the primary method used to convey information on the World Wide Web. HTTP is a request/response protocol between clients and servers. HTTPS is a secure version of HTTP.

A mobile device 110 may request a map and the map server 130 responds by streaming the map to the mobile device 110. In accordance with an alternative embodiment, the data server 120 and the map server 130 may be one in the same server providing both the asynchronous data connection 125 and the synchronous data connection 135 simultaneously. The map service provided by the map server 130 may be a standard commercially available map service, for example.

The network 100 may also include a plurality of global positioning system (GPS) receivers 140. Any one of the GPS receivers corresponds to a single mobile device 110. For example, a single mobile device 110 may be in communication with a single GPS receiver 140 via, for example, a Bluetooth® wireless connection 145. When the GPS receiver 140 is in operational proximity to the mobile device 110, the GPS receiver is able to transmit geographic location information to the mobile device 110 such that the geographic location information is representative of the current position or location of the mobile device 110. For example, the GPS receiver may be located in the pocket of a user of the mobile device 110, or strapped to a belt of the user.

As an alternative, a GPS receiver 140 may be an integral component of the mobile device 110. In such a configuration, the GPS receiver 140 is guaranteed to be in operational proximity to the mobile device 110. Furthermore, in such a configuration, the GPS receiver 140 communicates geographic location information internally within the mobile device 10 (e.g., via wired means).

As a further alternative, the network 100 may not use GPS receivers but, instead, may use another locating means such as, for example, cell tower triangulation techniques 141 to determine a current geographic position of a mobile device 110.

Each mobile device 110 of the network 100 includes a thin client software 111 capable of reading a data stream including geographic location information from the corresponding GPS receiver 140, transmitting the geographic location information to the data server 120 in real time via an asynchronous data communication connection 125 over a wireless network, and receiving position information (of other clients) back from the data server 120 using the same asynchronous data communication connection 125. A thin client is a client software in a client-server architecture network that depends mainly on a server or thick client for significant processing activities, and which focuses on conveying input and output between a user and a remote server. In contrast, a thick client does a large amount of processing and may pass data to a server only for communication and/or storage purposes.

In accordance with an embodiment, the asynchronous data connection 125 uses a proprietary TCP/IP based protocol using transport security layer (TLS) encryption to provide real-time secure communications between the data server 120 and the mobile device 110 over a wireless network. The data server 120 simply acts as a relay between the various clients (e.g., mobile devices 110). The thin client software 111 may be downloaded over the air or via a wired connection to the mobile device 110 from a server (e.g., from the map server 130) or from somewhere else. TCP/IP stands for Transmission Control Protocol/Internet Protocol which is a well-known suite of Internet protocols used for connecting hosts on the Internet. The proprietary TCP/IP based protocol is structured to take advantage of the Internet infrastructure and to communicate in a real-time manner with minimal delays and high reliability.

Each mobile device 110 of the network 100 also includes a thick client software 112 capable of generating a map request and transmitting the map request to the map server 130 via a synchronous data communication connection 135 (e.g., using a HTTPS protocol) over a wireless network and receiving a rendered map and/or un-rendered map data from the map server 130 via the same synchronous data communication connection 135 in response to the map request. The thick client software 112 is further capable of rendering a map 150 in response to receiving the map data and accurately overlaying indicia 155 corresponding to the geographic location information onto the rendered map 150. Alternatively, a pre-rendered map may be provided from the map server 130. The thick client software is also capable of displaying the rendered map 150 with the overlaid indicia 155 on a display of the mobile device 110. The overlaid indicia 155 are an accurate representation of the geographic positions of the mobile devices in the group as overlaid on the map 150.

The network 100 may also include non-mobile devices 160 having fixed geographic locations. Such non-mobile devices may include web applications, logging services, and other applications hosted on servers or other fixed computer-based devices. The non-mobile devices are able to interface (wired or wirelessly) to the data server 120 and the map server 130 and are able to track and view the geographic locations of the mobile devices 110 in a similar manner. However, the non-mobile devices 160 may not send their geographic positions to the data server 120 in an asynchronous manner since such geographic positions are fixed. Such fixed geographic positions may possibly be sent to the data server 120 as a one-time event to be shared with the mobile devices 110, for example. However, further updating of such fixed geographic positions may not be necessary. Also, such non-mobile devices 160 may be fully capable of sending and receiving text messages and status messages on the network 100.

The network 100 does not require a permanent storage or a centralized administration application to function. Clients 110 may connect to the network 100 without any configuration beyond the location of the data server 120. Messages from clients 110 are relayed to the rest of the network 100 as they are received, eliminating the need for permanent storage. Using such a method of operation, the data server 120 reduces the latency between the time at which a client 110 produces a location update, status message, text message, or other data, and the time that the other clients in the network are aware of the change. As a result, the task of maintaining the network 100 is simplified.

Figure 2:
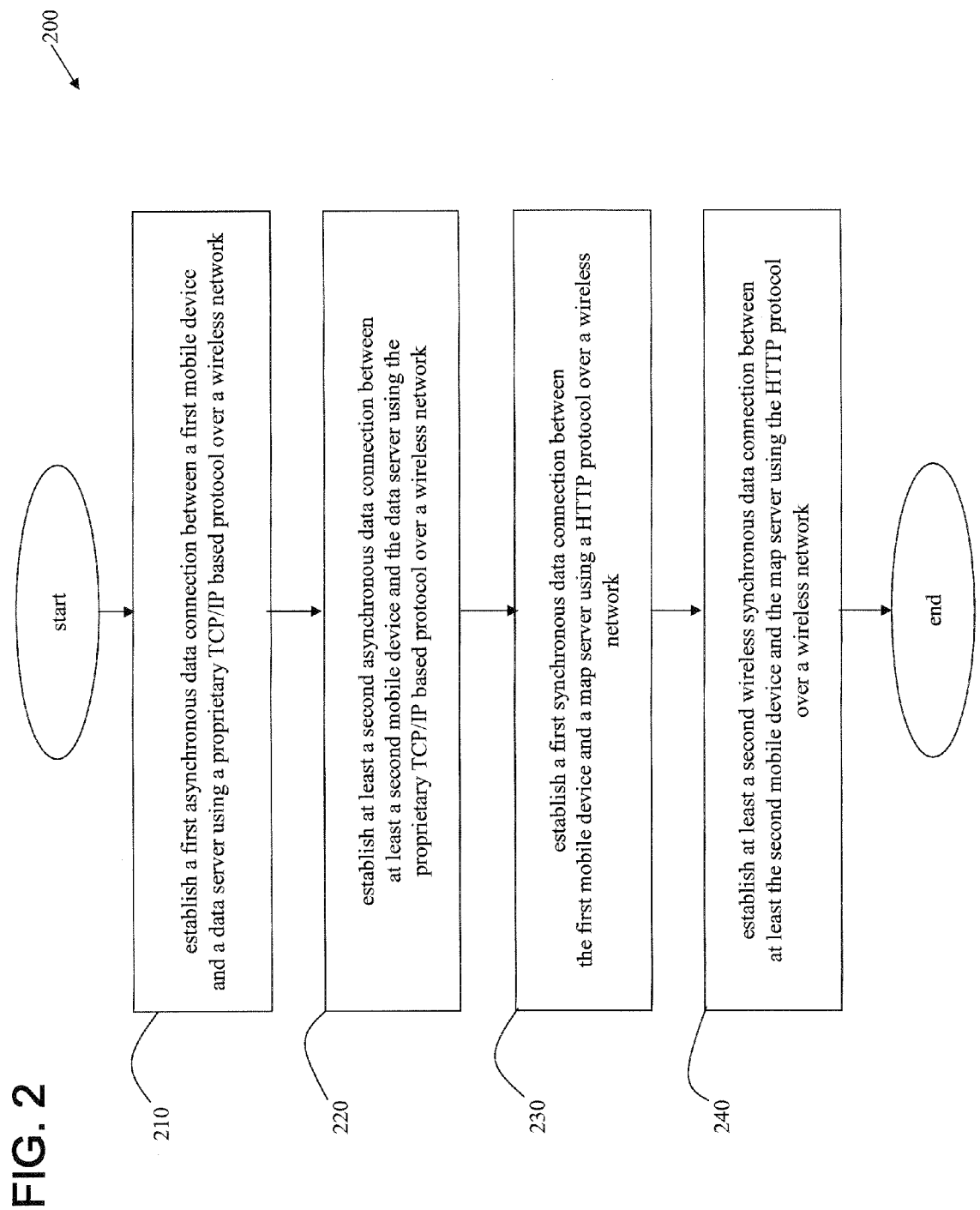
FIG. 2 illustrates a flowchart of an exemplary embodiment of a method to establish the real-time location based service network of FIG. 1.

FIG. 2 illustrates a flowchart of an exemplary embodiment of a method 200 to establish the real-time location based service network 100 of FIG. 1. In step 210, establish a first asynchronous data connection 125 between a first mobile device 110 and a data server 120 using a proprietary TCP/IP based protocol over a wireless network. In step 220, establish at least a second asynchronous data connection 125' between at least a second mobile device 110' and the data server 120 using the proprietary TCP/IP based protocol over a wireless network. In step 230, establish a first synchronous data connection 135 between the first mobile device 110 and a map server 130 using a HTTPS protocol over a wireless network. In step 240, establish at least a second synchronous data connection 135' between at least the second mobile device 110' and the map server 130 using the HTTPS protocol over a wireless network.

The method 200 may further include establishing a voice connection between the first mobile device 110 and the second mobile device 110' over a wireless cell phone network without disrupting the first asynchronous data connection 125 or the second asynchronous data connection 125'. The method 200 may also include establishing a first wireless data connection 145 between a first GPS receiver 140 and the first mobile device 110, where the first mobile device 110 is in operational proximity to the first GPS receiver 140. The method 200 may further include establishing a second wireless data connection 145' between a second GPS receiver 140' and the second mobile device 110', where the second mobile device 110' is in operational proximity to the second GPS receiver 140'.

Figure 3:
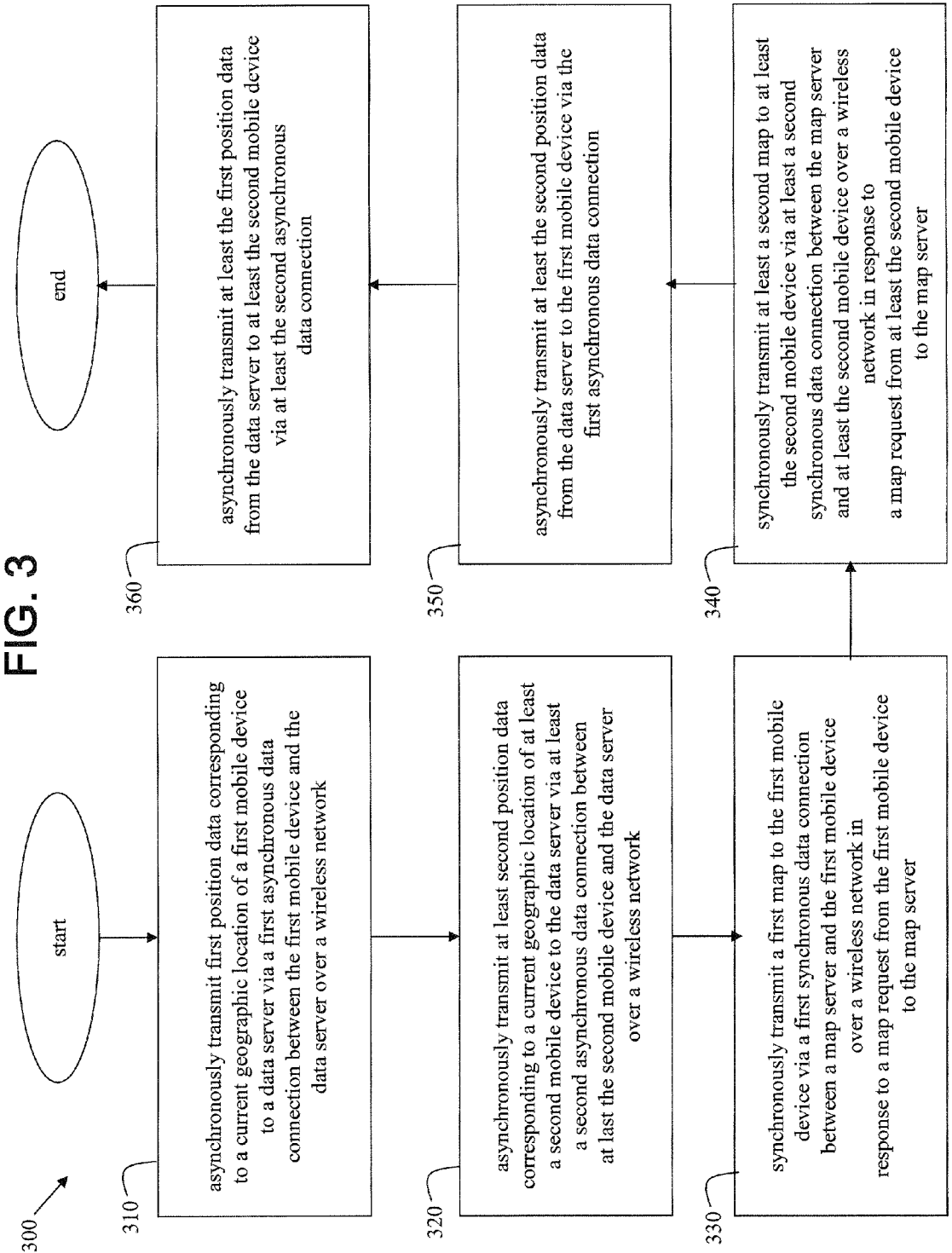
FIG. 3 illustrates a flowchart of an exemplary embodiment of a method to communicate location information of mobile device users over a wireless network in real time.

FIG. 3 illustrates a flowchart of an exemplary embodiment of a method 300 to communicate location information of mobile device users over a wireless network of in real time. In step 310, asynchronously transmit first position data corresponding to a current geographic location of a first mobile device 110 to a data server 120 via a first asynchronous data connection 125 between the first mobile device 110 and the data server 120 over a wireless network. In step 320, asynchronously transmit at least a second position data corresponding to a current geographic location of at least a second mobile device 110' to the data server 120 via at least a second asynchronous data connection 125' between at least the second mobile device 110' and the data server 120 over a wireless network.

In step 330, synchronously transmit a first map 150 to the first mobile device 110 via a first synchronous data connection 135 between a map server 130 and the first mobile device 110 in response to a map request from the first mobile device 110 to the map server 130 over a wireless network. In step 340, synchronously transmit at least a second map 150' to at least the second mobile device 110' via at least a second synchronous data connection 135' between the map server 130 and at least the second mobile device 110' in response to a map request from at least the second mobile device 110' to the map server 130 over a wireless network.

In step 350, asynchronously transmit at least the second position data from the data server 120 to the first mobile device 110 via the first asynchronous data connection 125. In step 360, asynchronously transmit at least the first position data from the data server 120 to at least the second mobile device 110' via at least the second asynchronous data connection 125'.

The method 300 may further include the first mobile device 110 processing at least the second position data to accurately overlay indicia 155 corresponding to at least the second position data on the first map 150, and to display the first map 150 with the overlaid indicia 155 on a display of the first mobile device 110. The method 300 may further include the second mobile device 110' processing at least the first position data to accurately overlay indicia 155' corresponding to at least the first position data on the second map 150', and to display the second map 150' with the overlaid indicia 155' on a display of the second mobile device 110'.

In accordance with an embodiment, the first and second asynchronous data connections use a proprietary TCP/IP based protocol using TLS encryption. Furthermore, the first and second synchronous data connections use a HTTPS protocol. The map and overlay (position data) are intentionally transmitted separately to improve real-time data updates. The map is coming from a map server in a synchronous manner and is provided separately from the location information which is updated asynchronously. Each client may receive a different map, however, each map may show the locations of all or some of the clients. The map may be any arbitrary map that the client (e.g., a mobile device) chooses and requests. As a result, the map is not necessarily based on a client's current location. A client (e.g., a mobile device) may change the frequency at which it sends position updates to the data server based, for example, on the speed of the wireless data network or battery life of the mobile device. The data server is able to handle such asynchronous and variable update rates without becoming confused.

Figure 4:
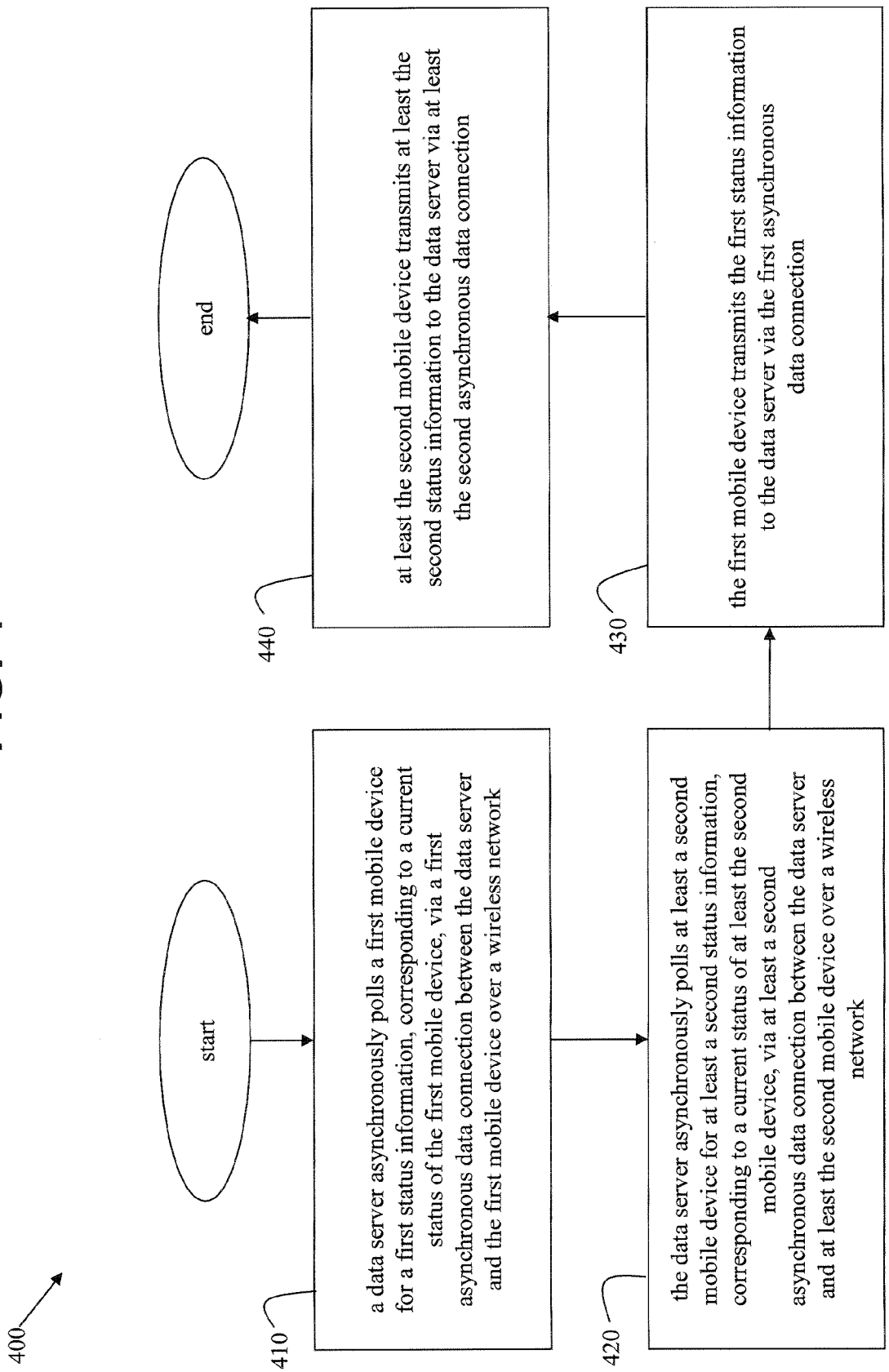
FIG. 4 illustrates a flowchart of an exemplary embodiment of a method to communicate status information over a wireless network in real time.

FIG. 4 illustrates a flowchart of an exemplary embodiment of a method 400 to communicate status information over a wireless network in real time. In step 410, a data server 120 asynchronously polls a first mobile device 110 for a first status information, corresponding to a current status of the first mobile device 10, via a first asynchronous data connection 125 between the data server 120 and the first mobile device 110 over a wireless network. In step 420, the data server 120 asynchronously polls at least a second mobile device 110' for at least a second status information, corresponding to a current status of at least the second mobile device 110', via at least a second asynchronous data connection 125' between the data server 120 and at least the second mobile device 110' over a wireless network. The data server 120 may ask the client (mobile device) for its status even if the client is not actively participating in the network 100 at the present time (e.g., if the client mobile device is idle or disconnected).

In step 430, the first mobile device 110 transmits the first status information to the data server 120 via the first asynchronous data connection 125. In step 440, at least the second mobile device 110' transmits at least the second status information to the data server 120 via at least the second asynchronous data connection 125'.

The method 400 may further include the data server 120 transmitting at least the first status information to at least the second mobile device 110' via at least the second asynchronous data connection 125', and the data server 120 transmitting at least the second status information to the first mobile device 110 via the first asynchronous data connection 125.

The method 400 may further include the first mobile device 110 asynchronously polling the data server 120 for a third status information, corresponding to a current status of the data server 120, via the first asynchronous data connection 125, and the data server 120 transmitting the third status information to the first mobile device 110 via the first asynchronous data connection 125.

The method 400 may also include at least the second mobile device 110' asynchronously polling the data server 120 for the third status information via at least the second asynchronous data connection 125', and the data server 120 transmitting the third status information to at least the second mobile device 110' via at least the second asynchronous data connection 125'. A status of a mobile device 110 or of a data server 120 may be, for example, one of being 'idle', 'on-line', 'off-line', 'active', 'in-active', 'failed', or 'disconnected'.

Figure 5:
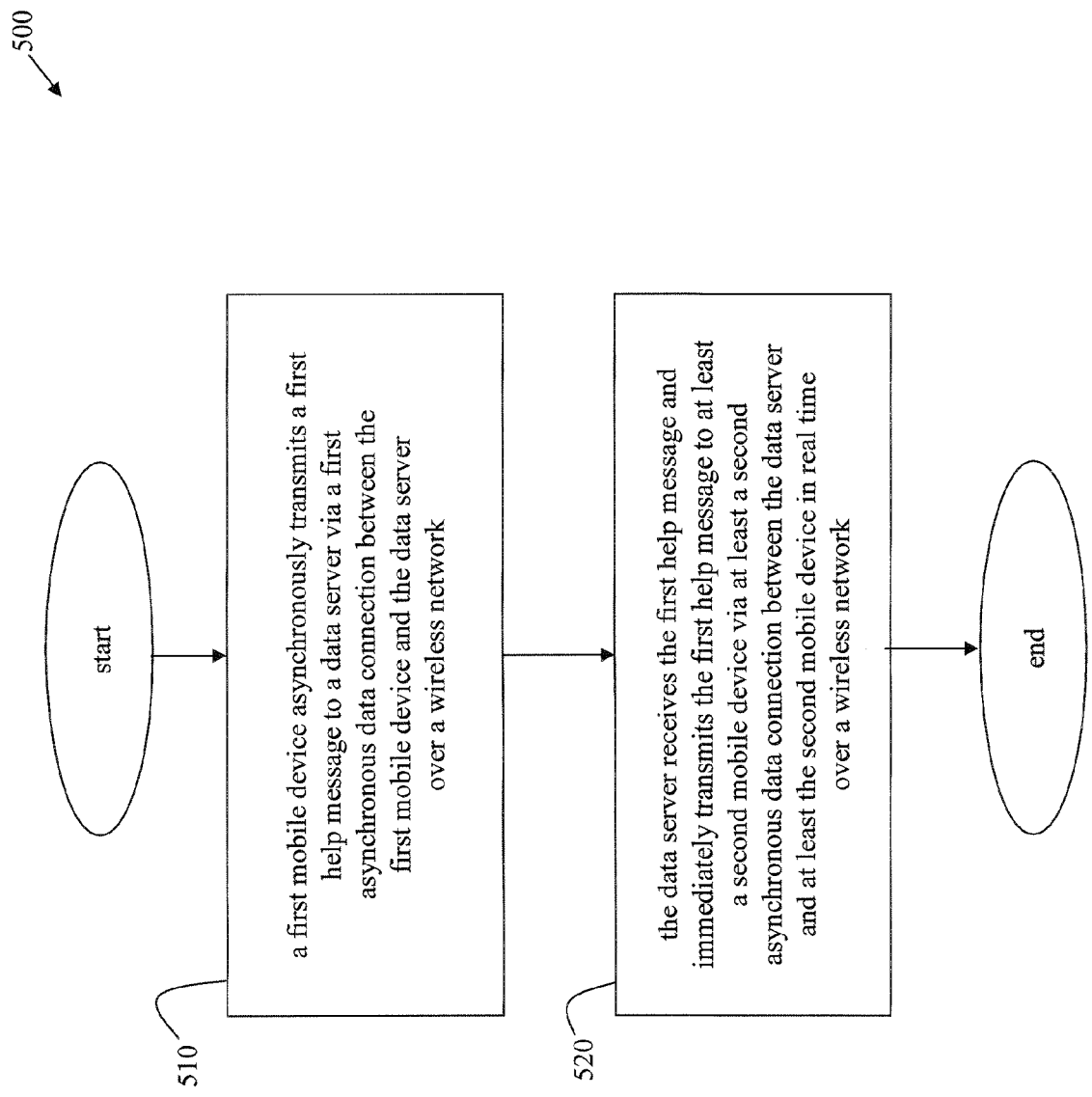
FIG. 5 illustrates a flowchart of an exemplary embodiment of a method to communicate help information over a wireless network in real time.

FIG. 5 illustrates a flowchart of an exemplary embodiment of a method 500 to communicate help information over a wireless network in real time. In step 510, a first mobile device 110 asynchronously transmits a first help message to a data server 120 via a first asynchronous data connection 125 between the first mobile device 110 and the data server 120 over a wireless network. The help message may be initiated by a user pressing a 'panic' button on his mobile device 110, for example. In step 520, the data server 120 receives the first help message and immediately transmits the first help message to at least a second mobile device 110' via at least a second asynchronous data connection 125' between the data server 120 and at least the second mobile device 110' in real time over a wireless network.

The method 500 may further include at least the second mobile device 110' displaying an indication of the help message on a display of at least the second mobile device 110' such that the displayed indication is clearly associated with the first mobile device 110 on the display (e.g., a blinking icon or indicia on the display). The method 500 may also include at least the second mobile device 110' sounding an audible alert in response to receiving the help message.

The method 500 may further include at least the second mobile device 110' transmitting a reply message to the data server 120 in response to the help message via at least the second asynchronous data connection 125', and the data server 120 relaying the reply message to the first mobile device 110 via the first asynchronous data connection 125.

Figure 6:
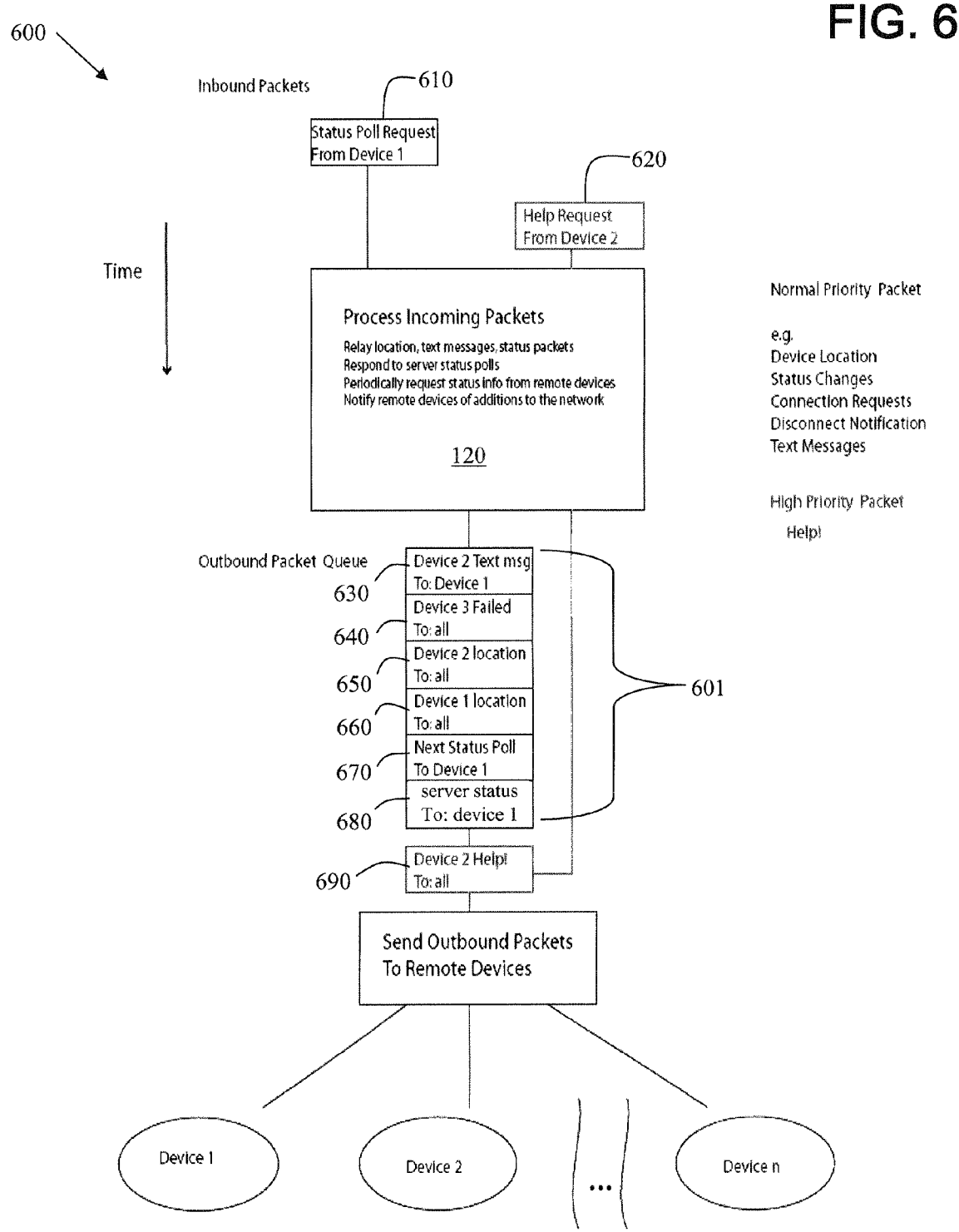
FIG. 6 illustrates a functional block diagram of an exemplary embodiment of a prioritized messaging scheme used in the real-time location based service network of FIG. 1.

FIG. 6 illustrates a functional block diagram of an exemplary embodiment of a prioritized messaging scheme 600 used in the real-time location based service network 100 of FIG. 1. Referring to FIG. 1, information is communicated between a mobile device 110 and a data server 120 in the form of data packets over a asynchronous data connection 125 over a wireless network (e.g. using a proprietary TCP/IP based protocol that uses TLS encryption). FIG. 6 refers to incoming and outgoing data packets with respect to the data server 120. As seen in FIG. 6, an inbound status poll request packet 610 is received by the data server 120 from a first mobile device (device 1). That is, the first mobile device (device 1) is polling the data server 120 for the current status of the data server 120. Next, an inbound help request packet 620 is received by the data server 120 from a second mobile device (device 2). That is, a second mobile device (device 2) is requesting help (e.g., sending out a distress message) to the data server 120.

On the outbound side, the data server 120 transmits an outbound packet queue 601 to the various mobile devices. However, the help request packet 620 previously received by the data server 120 from the second mobile device (device 2) is recognized as a help message and is given a higher priority by the data server 120 than any of the other packets in the outbound packet queue 601. Therefore, the help request packet 620 is processed by the data server 120 first and relayed as a priority outbound help message 690 to all of the devices (device 1 to device n) on the network 100 before any of the other packets in the outbound packet queue 601 are relayed.

The outbound packet queue 601 from the data server 120 includes a text message packet 630 being relayed from the second mobile device (device 2) to the first mobile device (device 1) by the data server 120. The outbound packet queue 601 also includes a status message packet 640 being relayed to all devices on the network 100 and indicating that a third mobile device (device 3) has failed. Such a status message packet 640 is transmitted to all the devices on the network 100 as a result of the data server 120 having previously polled the third mobile device (device 3) for its current status and having received that status back from the third mobile device (device 3).

The outbound packet queue 601 further includes a location message packet 650 being relayed to all devices on the network 100 and indicating the current geographic position of the second mobile device (device 2). Such a location message packet 650 is transmitted to all the devices on the network 100 as a result of the second mobile device (device 2) having previously asynchronously transmitted its current position data to the data server 120.

Similarly, the outbound packet queue 601 further includes a location message packet 660 being relayed to all devices on the network 100 and indicating the current geographic position of the first mobile device (device 1). Such a location message packet 660 is transmitted to all the devices on the network 100 as a result of the first mobile device (device 1) having previously asynchronously transmitted its current position data to the data server 120.

The outbound packet queue 601 further includes a next status polling packet 670 to the first mobile device (device 1). That is, the data server 120 is asynchronously polling the first mobile device (device 1) for its current status. It does not matter if device 1 is currently active on the network 100 or not. The data server 120 is able to poll device 1 (and any other device, for that matter) for its current status.

The outbound packet queue 601 further includes a server status packet 680 to the first mobile device (device 1) in response to the previous status poll request 610 from device 1. The server status packet 680 may be sent asynchronously to the first mobile device (device 1), providing the current status of the data server 120 to the first mobile device (device 1).

FIG. 7 illustrates an exemplary embodiment of a communication timeline 700, in accordance with the real-time location based service network 100 of FIG. 1. The upper portion of FIG. 7 illustrates the asynchronous communication that may occur between a mobile device 110 and a data server 120 over a wireless network. The lower portion of FIG. 7 illustrates the synchronous communication that may occur between a mobile device 110 and a map server 130 over a wireless network.

As seen in the upper portion of FIG. 7, a mobile device 110 may send location data to the data server 120, poll the status of the data server 120, and send text messages to the data server 120, all in an asynchronous manner. Furthermore, the mobile device 110 may receive text messages from the data server 120, receive location data of other mobile devices from the server 120, and receive a status of the server 120, all in an asynchronous manner. Whenever the mobile device 110 receives data from the server, the display of the mobile device is refreshed and updated with the new information.

As seen in the lower portion of FIG. 7, a mobile device 110 may request a map from the map server 130. When a map is requested, the map server 130 synchronously responds by downloading a new map to the mobile device 110. The display of the mobile device 110 is updated and refreshed with the new map and any updated overlaid indicia when downloading of the new map is complete. As can be seen in FIG. 7, many asynchronous communications between the data server 120 and the mobile device 110 may occur during the time that a map is being downloaded. As a result, the asynchronous data connection between the data server 120 and the mobile devices 110 allows for real time data communication (e.g., location updating) between the mobile devices 110 with the data server 120 acting as a real time relay. In accordance with an embodiment, the data server 120 and the map server 130 are able to support hundreds of mobile devices 110 at the same time, providing location based services in real time.

In accordance with an alternative embodiment, a client may be able to disconnect from one server, defining a first user group, and connect to another server, defining another user group (e.g., another group of client mobile devices). In accordance with another alternative embodiment, a client may be able to connect to more than one server at a time in order to obtain position data of clients from different groups and display indicia associated with that position data on a map.

Ideally, a mobile device is always capable of transmitting and receiving position data even when it is receiving a map update. However, some mobile devices may have difficulty supporting such simultaneous communication. Therefore, as still a further alternative embodiment, the map server may be capable of segmenting a map into smaller data portions and asynchronously sending those smaller data portions to a mobile device in between sending other messages such as status requests and location data. A request from the mobile device is still needed to initiate such a segmented map transfer. Such an asynchronous and segmented map transfer map overcome any problem that a mobile device may have with being able to transmit and receive position data when it is receiving a synchronous map update.

In summary, a network and method to establish a real-time location based service for client mobile device users are disclosed. Asynchronous data connections over a wireless network are established between client devices and a data server. Synchronous data connections over a wireless network are established between the client devices and a map server. The data server receives geographic location information from the client mobile devices, indicating a geographic location of each mobile device, and relays the geographic location information to the client devices in real time via the asynchronous data connections. The map server provides map data to the client devices as requested from the client devices via the synchronous data connections. The geographic location information may be overlaid onto the map data and displayed on any of the client devices to indicate the various locations of the various client mobile devices.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A real-time location based service network for mobile device users, said network comprising:
    a plurality of mobile devices;
    a data server configured to asynchronously relay at least geographic location information, status information, and text information between said plurality of mobile devices in real time, and wherein each of said plurality of mobile devices is configured to be in asynchronous data communication with said data server over a wireless network to accomplish said relaying; and
    a map server configured to synchronously provide a map service to each of said plurality of mobile devices, and wherein each of said plurality of mobile devices is configured to be in synchronous data communication with said map server over a wireless network to accomplish said providing.

2. The network of claim 1 further comprising a plurality of GPS receivers, wherein any one of said GPS receivers corresponds to a single mobile device of said plurality of mobile devices.

3. The network of claim 2 wherein each of said plurality of mobile devices includes a thin client software configured to read a data stream including geographic location information from said corresponding GPS receiver and transmit said geographic location information to said data server in real time via said asynchronous data communication.

4. The network of claim 1 wherein each of said plurality of mobile devices includes a thick client software configured to generate a map request and transmit said map request to said map server via said synchronous data communication and receive map data from said map server via said synchronous data communication in response to said map request.

5. The network of claim 4 wherein said thick client software is further configured to render a map in response to receiving said map data, accurately overlay indicia corresponding to said geographic location information onto said rendered map, and display said rendered map with said overlaid indicia on a display of said mobile devices.

6. The network of claim 1 wherein said plurality of mobile devices include at least one of cell phone type devices, personal digital assistant (PDA) type devices, portable media player type devices, laptop computer type devices, and wireless handheld type devices.

* * * * *